United States Patent
Yu

(12) United States Patent (10) Patent No.: US 8,191,845 B1
(45) Date of Patent: Jun. 5, 2012

(54) MULTI-FUNCTION HOOK

(75) Inventor: Stephen Yu, Taoyuan (TW)

(73) Assignee: Clair Home Products Inc., Taoyuan County (TW)

( * ) Notice: Subject to any disclaimer, the term of this patent is extended or adjusted under 35 U.S.C. 154(b) by 0 days.

(21) Appl. No.: 12/987,160

(22) Filed: Jan. 10, 2011

(51) Int. Cl.
*F16B 45/00* (2006.01)

(52) U.S. Cl. ............ 248/304; 248/220.42; 248/303; 248/551

(58) Field of Classification Search .......... 248/304
See application file for complete search history.

(56) References Cited

U.S. PATENT DOCUMENTS

| | | | | |
|---|---|---|---|---|
| 5,009,381 A | * | 4/1991 | Hermanson | 248/220.42 |
| 6,003,685 A | * | 12/1999 | Malin | 211/7 |
| 6,129,221 A | * | 10/2000 | Shaha | 211/87.01 |
| 6,811,043 B2 | * | 11/2004 | Perkins et al. | 211/94.01 |
| 7,694,925 B2 | * | 4/2010 | Kokenge et al. | 248/220.42 |
| 7,775,492 B2 | * | 8/2010 | Pierzynski et al. | 248/220.43 |
| 7,900,781 B2 | * | 3/2011 | Baine et al. | 211/59.1 |
| 2005/0121573 A1 | * | 6/2005 | Ahlund et al. | 248/220.21 |

* cited by examiner

*Primary Examiner* — Terrell McKinnon
*Assistant Examiner* — Monica Millner
(74) *Attorney, Agent, or Firm* — CKC & Partners Co., Ltd.

(57) ABSTRACT

A multi-function hook is provided. The multi-function hook includes a hook unit and a plug unit. The hook unit includes a fixing board and at least one hook body. The fixing board includes a first L-shaped sheet and a second L-shaped fixing sheet having a hole respectively. The fixing board further includes at least one first protruded hook member, and an assembling hole disposed corresponding to the second L-shaped fixing sheet. The hook body is fixed on the front surface of the fixing board. The plug unit is assembled to the assembling hole and is fixed on the fixing board. The plug unit includes a cover and at least one second protruded hook member connecting with the cover. The cover includes a hollow hole disposed corresponding to the second L-shaped fixing sheet. The hook is fixed on a fixing body by nailing way with the first and the second L-shaped fixing sheets, and the hook is fixed on a fixing body by fastening way with the first and the second protruded hook members, so that the hook would be fixed by nailing and fastening ways.

5 Claims, 6 Drawing Sheets

MULTI-FUNCTION HOOK

BACKGROUND

1. Technical Field

The present invention relates to a fastener, more particularly to a hook.

2. Description of Related Art

Hooks are used for hanging objects vertically so as to provide locations for placing objects or displaying of many objects for sale. Thus hooks may save the space to plane display the objects and help users with taking objects hung on the hooks conveniently. Furthermore, hooks are beneficial for costumers to view and compare the objects hung on hooks in stores, so that costumers can choose what they want easily.

Hooks have to be fixed on a vertical fixing body (e.g. a wall or a groove shelf) for being hung objects. Hooks can be fixed on the fixing body in different ways, wherein the general ways for fixing the hooks includes nailing way and fastening way. The nailing way means that the hooks are nailed or screwed on the fixing body (e.g. a wall). The fastening way means that a groove shelf is fixed on the wall firstly, and then the hooks are hooked on the groove shelf and can be slid on the groove shelf.

A conventional hook usually only has a single fixing structure to be fixed on the fixing body, for example, the conventional hook only has a fixing sheet capable of being nailed on the wall or has a protruded hook member capable of being fastened on a trench disposed on the groove shelf. Namely, the single conventional hook is unable to have the nailing function and the fastening function simultaneously. Therefore it is inconvenient to the users for choosing the fixing ways of the hooks. Furthermore, the manufacturers have to manufacture the nailing hooks and the fastening hooks simultaneously so as to provide users with what they want to buy and use, and the cost of the manufacture and the space of the displays are increased.

Due to the reasons mentioned above, the applicability of the conventional hooks is unfavorable.

SUMMARY

One object of the present invention is to provide a multi-function hook capable of being fixed by nailing and fastening.

According to the object of the above mentioned, an aspect of the present invention provides a multi-function hook including a hook unit and a plug unit. The hook unit includes a fixing board and at least one hook body. The fixing board includes a front surface, a back surface opposite to the front surface, a first L-shaped fixing sheet, a second L-shaped fixing sheet, at least one first protruded hook member, and an assembling hole. The hook body is fixed on the front surface of the fixing board. The first L-shaped fixing sheet is disposed on a top of the fixing board and protrudes toward the back surface, and the first L-shaped fixing sheet includes a first hole. The second L-shaped fixing sheet is disposed near a bottom of the fixing board and protrudes toward the back surface, and the second L-shaped fixing sheet includes a second hole. The first protruded hook member is disposed on the top of the fixing board and protrudes toward the back surface. The assembling hole is disposed corresponding to the second L-shaped fixing sheet. In addition, the plug unit is assembled to the assembling hole and is fixed on the fixing board. The plug unit includes a cover and at least one second protruded hook member connecting with the cover. The second protruded hook member protrudes toward the back surface of the fixing board. The cover includes a hollow hole disposed corresponding to the second L-shaped fixing sheet. The hook is fixed on a fixing body by nailing way with the first and the second L-shaped fixing sheets, and the hook is fixed on a fixing body by fastening way with the first and the second protruded hook members, so that the hook would be fixed by nailing and fastening ways.

In an embodiment of the present invention, at least one concave is disposed on an inner edge of a top of the assembling hole. A neck portion is formed between the second protruded hook member and the cover, wherein the neck portion is coupled to the concave, so that the plug unit and the assembling hole would be assembled completely.

In an embodiment of the present invention, two elastic side wings are disposed on opposite sides of the cover respectively. After the plug unit is assembled to the assembling hole, and the elastic side wing is disposed on an external edge of the back surface of the assembling hole, so that the assembly of the plug unit and the assembling hole is fixed more firmly to prevent the plug unit from falling off the assembling hole.

In an embodiment of the present invention, a non-slip portion with an uneven surface is disposed on a surface of the cover, so that the plug unit is advantageous to be pushed to move.

In an embodiment of the present invention, a round top hook portion is disposed on a top of the second protruded hook member, so that the second protruded hook member would pass through an edge of a trench disposed on the fixing body smoothly, then the second protruded hook member would be guided in the trench.

In an embodiment of the present invention, the back surfaces of the first protruded hook member, the second protruded hook member, the first L-shaped fixing sheet, and the second L-shaped fixing sheets are placed on a same plane. When the first and the second L-shaped fixing sheets are fixed on the fixing body, the back surfaces of the first and the second protruded hook members both sustain the fixing body so as to improve the firmness for the fixing hook.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
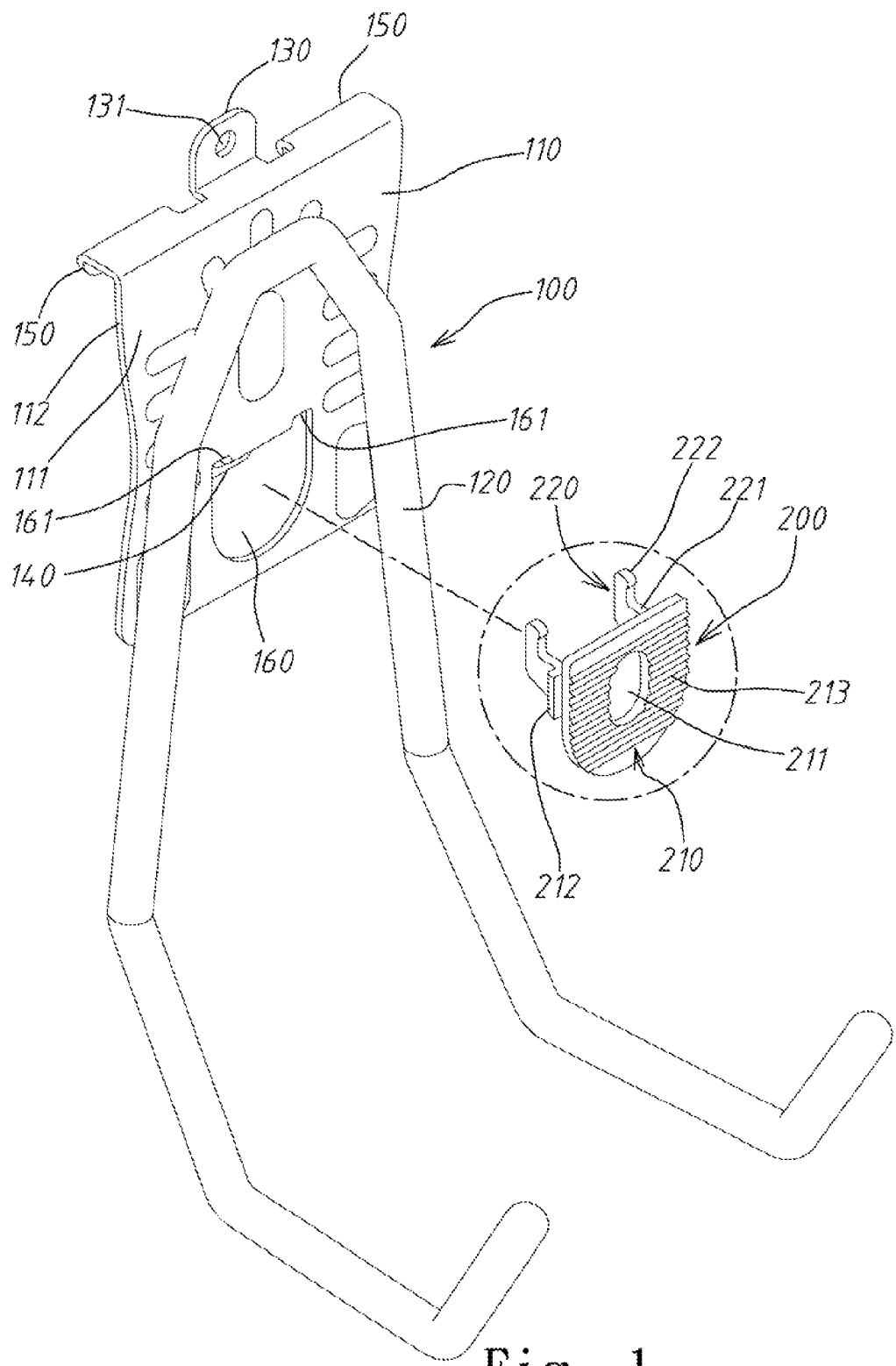
FIG. 1 illustrates a separation chart of a multi-function hook of an embodiment of the present invention.
Figures 2, 3:
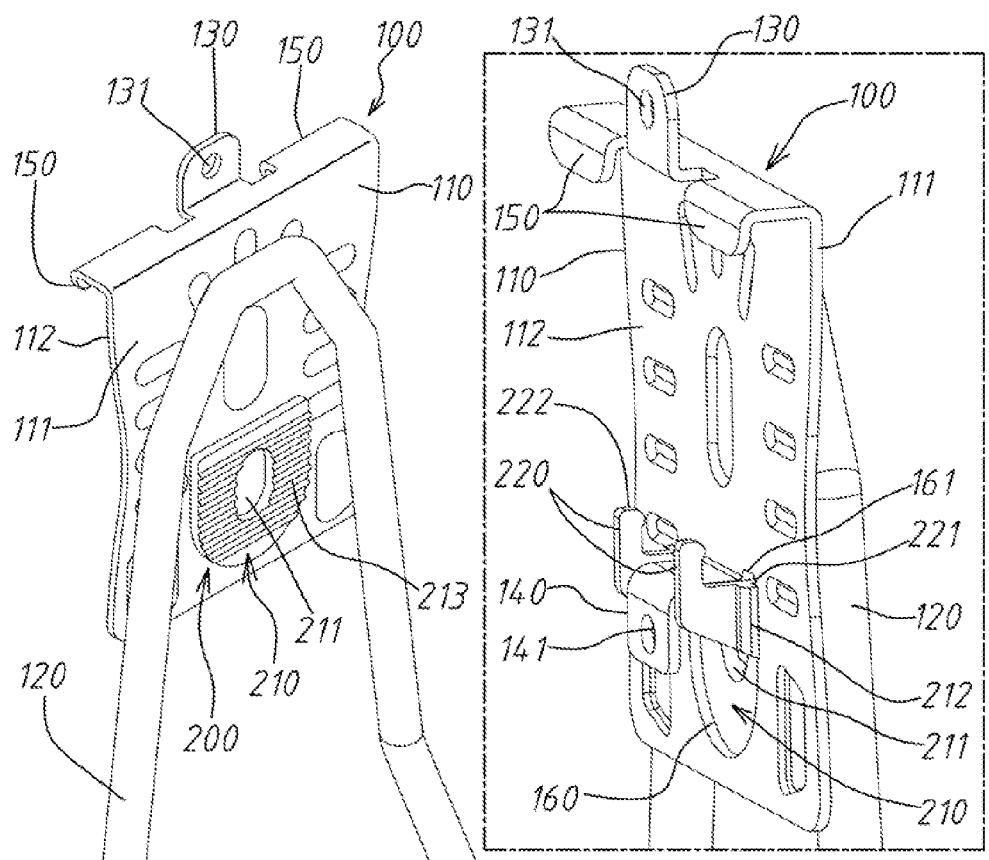
FIG. 2 illustrates an assembly chart of a multi-function hook of an embodiment of the present invention.
FIG. 3 illustrates a partial enlarged view saw from a back surface of a multi-function hook shown in FIG. 2.
Figures 4, 5:
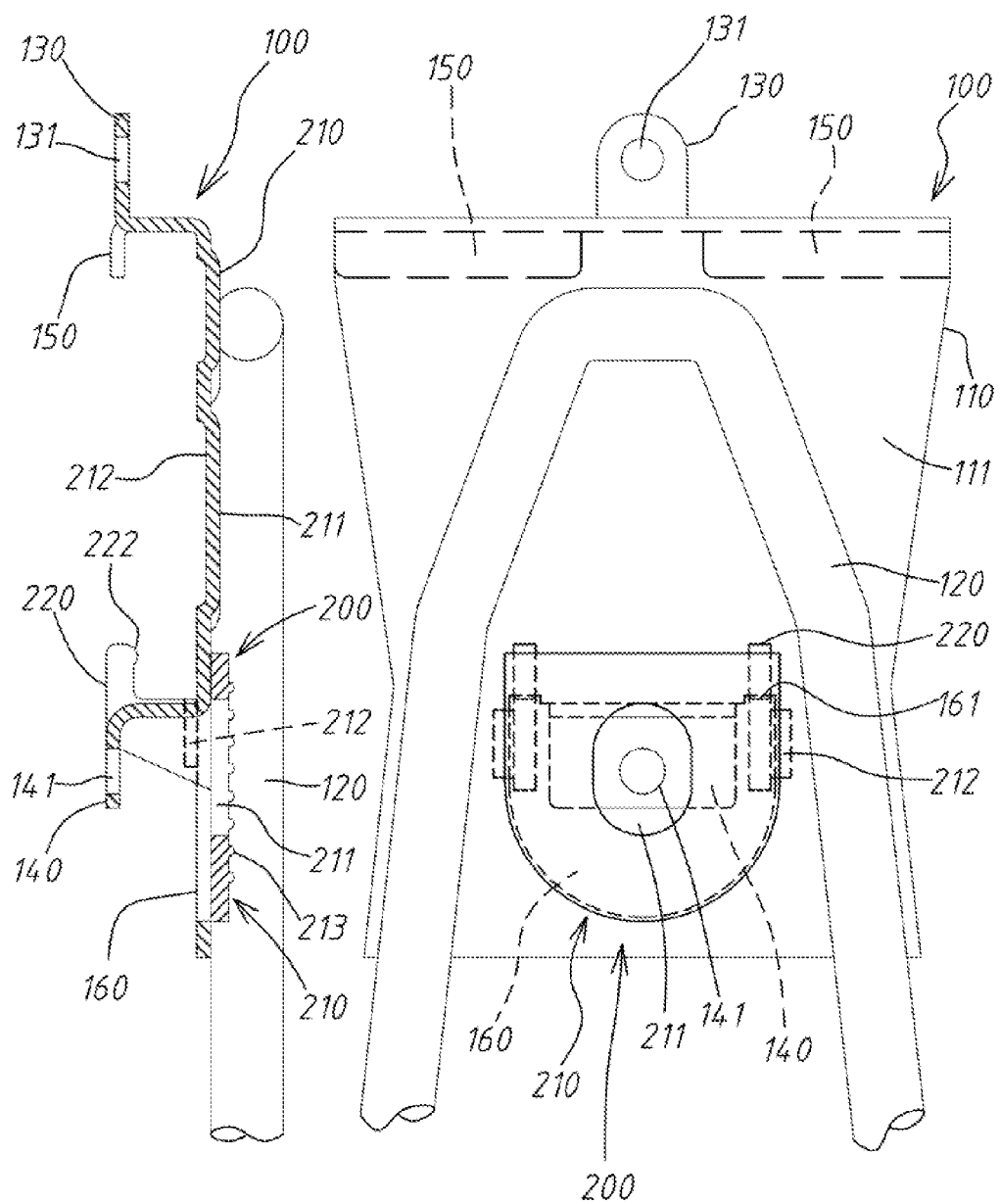
FIG. 4 illustrates a cross-sectional view of a multi-function hook shown in FIG. 2.
FIG. 5 illustrates a front schematic view of a multi-function hook shown in FIG. 2.

Refer to FIG. 1 to FIG. 5. FIG. 1 illustrates a separation chart of a multi-function hook of an embodiment of the present invention, FIG. 2 illustrates a assembly chart of a multi-function hook of an embodiment of the present invention, FIG. 3 illustrates a partial enlarged view saw from a back surface of a multi-function hook shown in FIG. 2, FIG. 4 illustrates a cross-sectional view of a multi-function hook shown in FIG. 2, and FIG. 5 illustrates a front schematic view of a multi-function hook shown in FIG. 2. As shown in FIG. 1 to FIG. 5, the multi-function hook of an embodiment of the present invention includes a hook unit 100 and a plug unit 200.

In this embodiment, the hook unit 100 is metalwork. The hook unit 100 includes a fixing board 110 and a hook body 120. The fixing board 110 includes a front surface 111 and a back surface 112 opposite to the front surface 111. The first L-shaped fixing sheet 130 is disposed on a top of the fixing board 110 (e.g. punching) and protrudes toward the back surface 112 of the fixing board 110, and the first L-shaped fixing sheet 130 includes a first hole 131. The second L-shaped fixing sheet 140 is disposed near a bottom of the fixing board 110 and protrudes toward the back surface 112 of the fixing board 110, and the second L-shaped fixing sheet 140 includes a second hole 141. The first L-shaped fixing sheet 130 and the second L-shaped fixing sheet 140 are fixed on a fixing body by nailing way (mentioned hereinafter). Two first protruded hook members 150 are disposed on the top of the fixing board 110 and protruding toward the back surface 112, and the fixing board 110 includes a hollow assembling hole 160 disposed corresponding to the second L-shaped fixing sheet 140. The plug unit 200 is assembled to the assembling hole 160 and is fixed on the fixing board 110.

The hook body 120 is fixed on the front surface 111 of the fixing board 110 (e.g. soldering) for hanging objects.

In this embodiment, the plug unit 200 is plastic, and the plug unit 200 is assembled to the assembling hole 160 and is fixed on the fixing board 110. The plug unit 200 includes a cover 210 and two second protruded hook member 220 connecting with the cover 210. The cover 210 includes a hollow hole 211 disposed corresponding to the second L-shaped fixing sheet 140 of the fixing board 110 capable of having no effect on nailing the second L-shaped fixing sheet 140. The second protruded hook member 220 protrudes toward the back surface 112 of the fixing board 110, and a neck portion 221 is formed between the second protruded hook member 220 and the cover 110. Correspondingly, two concaves 161 are disposed on an inner edge of a top of the assembling hole 160 of the fixing board 110. After the plug unit 200 is disposed in the assembling hole 160 by the front surface 111 of the fixing board 110, then the plug unit 200 is pushed upwards, so that the neck portion 221 of the second protruded hook member 220 is coupled to the concave 161 of the assembling hole 160 to achieve the combination of the plug unit 200 and the assembling hole 160, and the second protruded hook member 220 of the plug unit 200 is disposed on the back surface of the fixing board 110. The second protruded hook member 220 of the plug unit 200 and the first protruded hook member 150 of the fixing board 110 are both fastened on the groove shelf (mentioned hereinafter).

To push the plug unit 200 advantageously, a non-slip portion 213 with an uneven surface is disposed on a surface of the cover 210, so that the plug unit 200 is forced to push conveniently. In addition, in order to improve the firmness of the combination between the plug unit 200 and the assembling hole 160, two elastic side wings 212 are disposed on opposite sides of the cover 210 respectively. When the plug unit 200 is disposed in the assembling hole 160 from the front surface, the elastic side wing 212 is deformed so as to pass through a sidewall of the assembling hole 160. When the plug unit 200 is assembled to its location, the elastic side wing 212 recovers its original shape and is positioned on an outer edge of the back surface of the assembling hole 160. Therefore, the relationship of the combination between the plug unit 200 and the assembling hole 160 is firmer to prevent the plug unit 200 from falling off the assembling hole 160.

Figure 6:
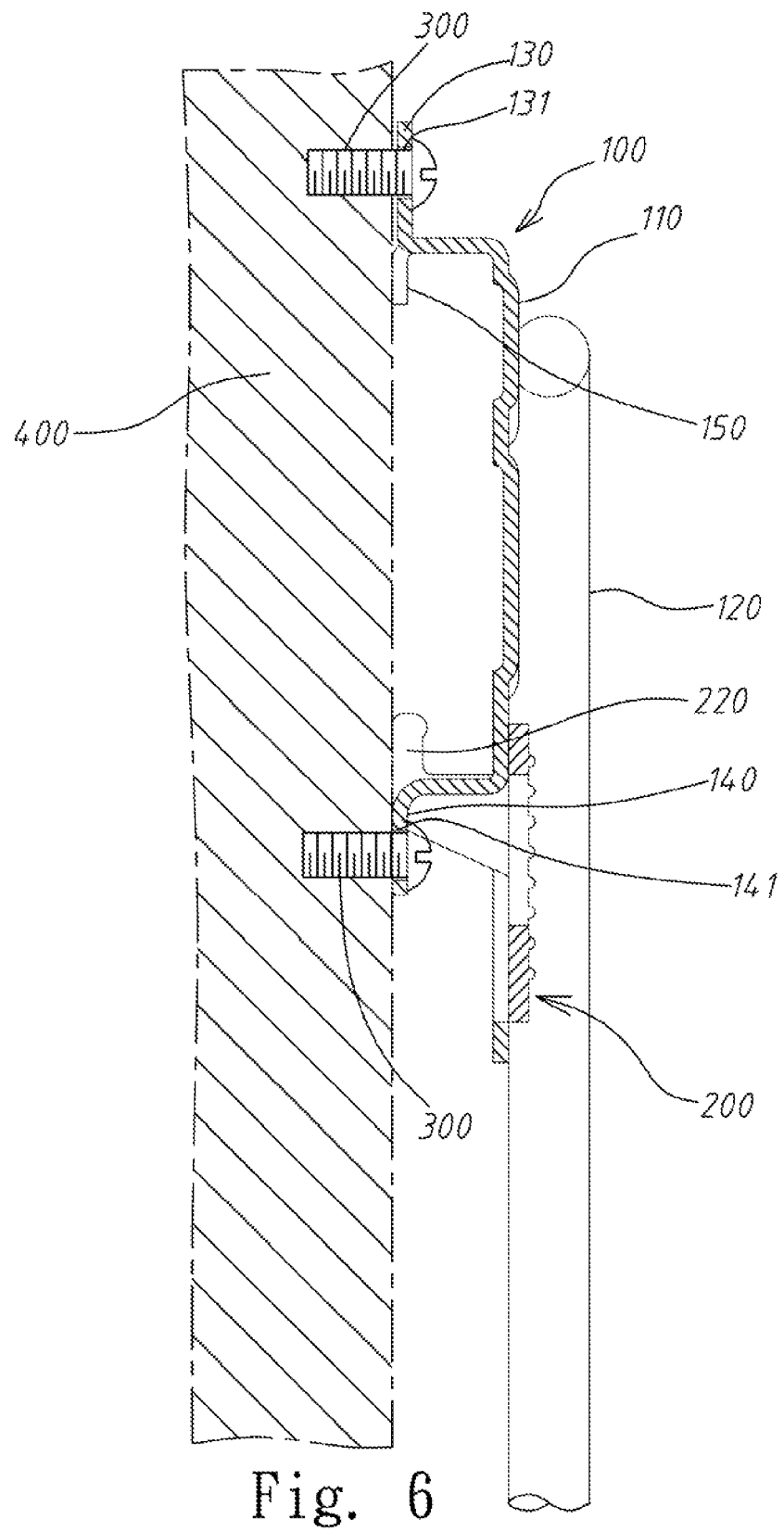
FIG. 6 illustrates a schematic view of a multi-function hook nailed on a wall shown in FIG. 4.

Refer to FIG. 6. FIG. 6 illustrates a schematic view of a multi-function hook nailed on a wall in accordance with an embodiment of the present invention. In this embodiment, the fastener 300 such as a steel nail or a screw passes through the first hole 131 of the first L-shaped fixing sheet 130 and the second hole 141 of the second L-shaped fixing sheet 140 to fix the hook on a wall 400. The back surfaces of the first protruded hook member, the second protruded hook member, the first L-shaped fixing sheet, and the second L-shaped fixing sheets are placed on a same plane. When the first L-shaped fixing sheet 130 and the second L-shaped fixing sheet 140 are fixed on the wall 400, the back surfaces of the first protruded hook member 150 and the second protruded hook member 220 both sustain the wall 400 so as to improve the firmness for the fixing hook.

Figure 7:
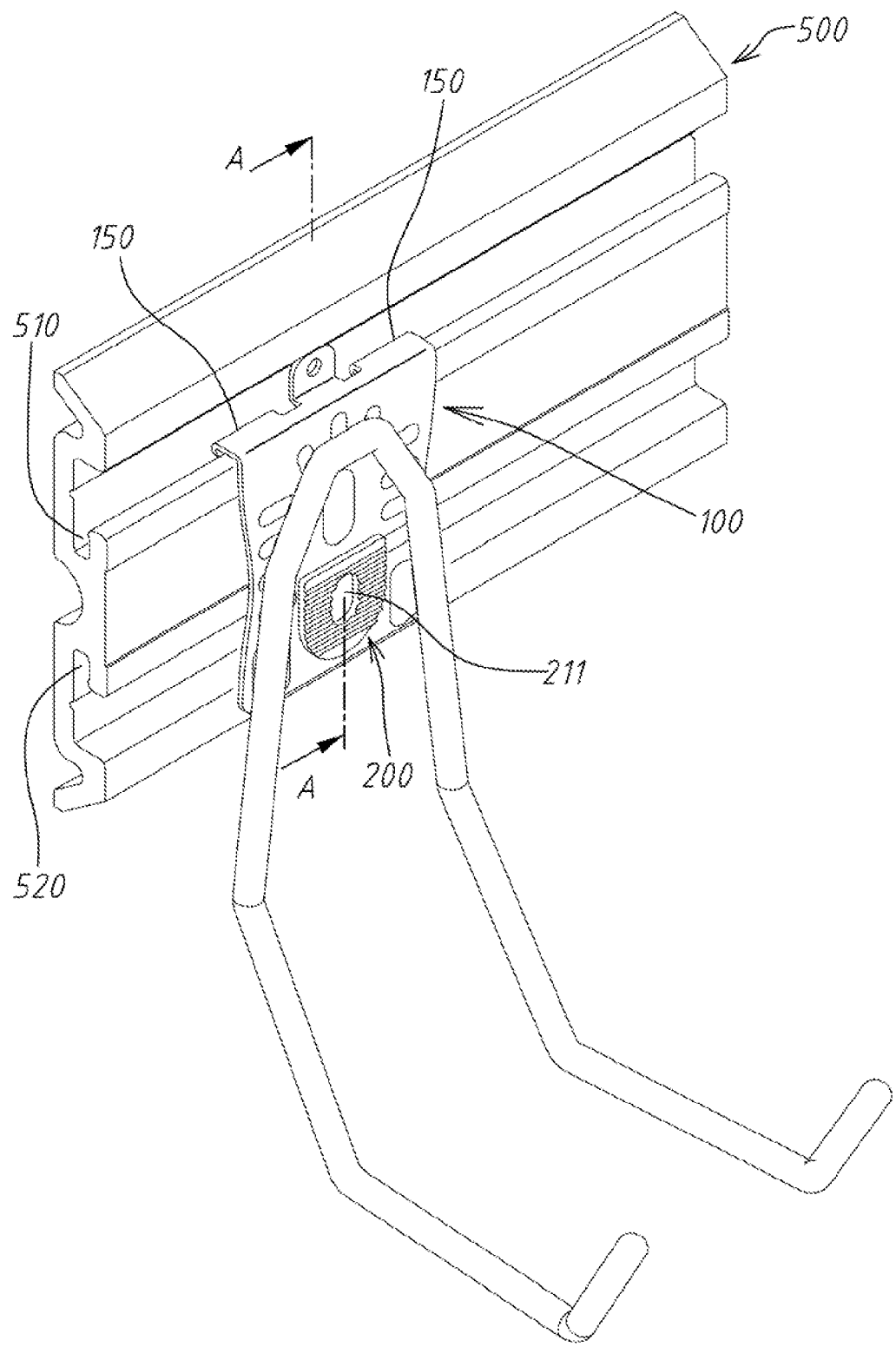
FIG. 7 illustrates a schematic view of a multi-function hook fastened on a groove shelf shown in FIG. 2.
Figure 8:
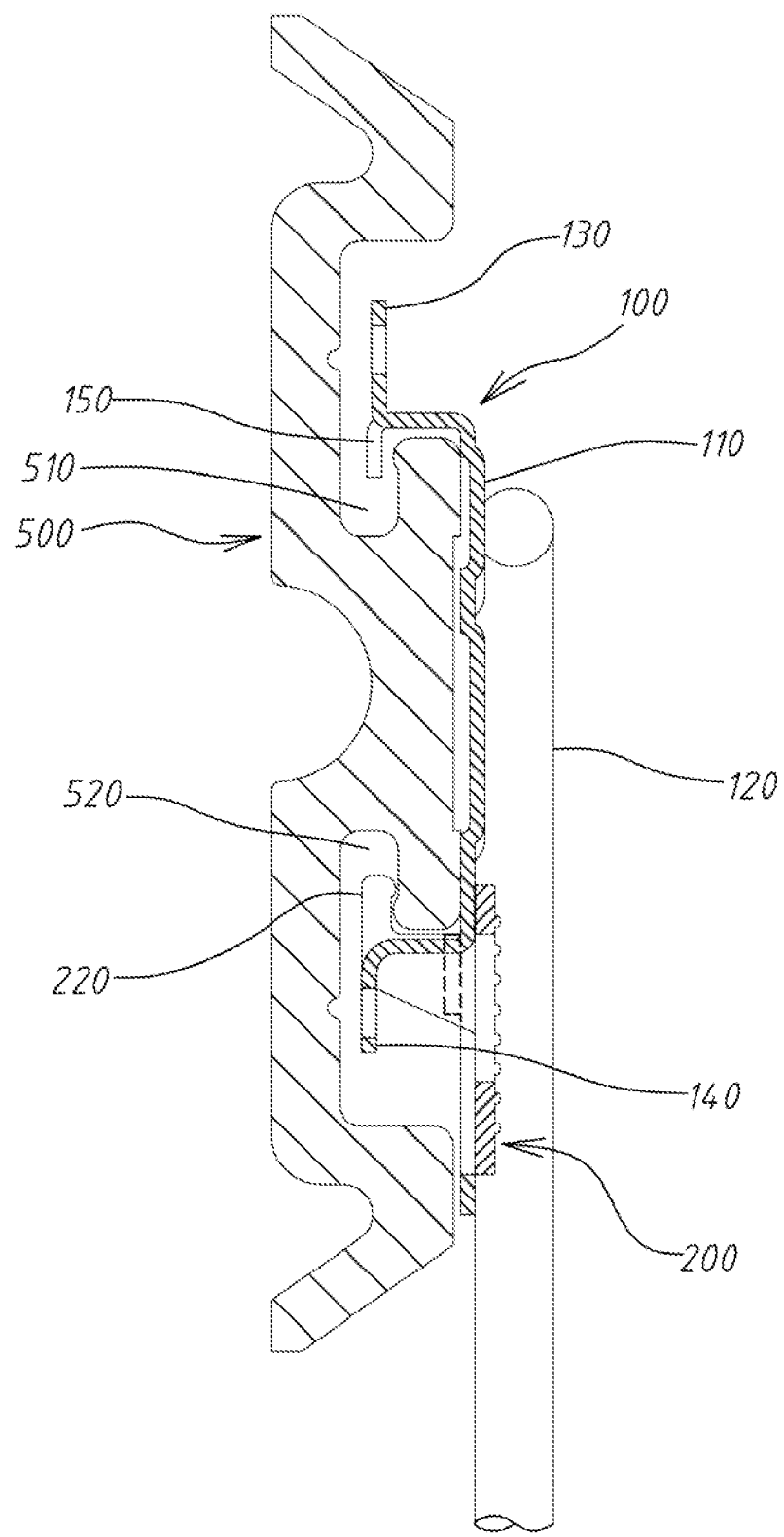
FIG. 8 illustrates a cross-sectional view taken along line A-A of a multi-function hook shown in FIG. 7.

Refer to FIG. 7 and FIG. 8. FIG. 7 and FIG. 8 illustrate a schematic view and a cross-sectional view of a multi-function hook fastened on a groove shelf respectively in accordance with an embodiment of the present invention. The groove shelf 500 includes a first trench 510 and a second trench 520 opposite to the first trench 510, and the first trench 510 and the second trench 520 extend axially along the groove shelf 500. The hook fastens the first trench 510 and the second trench 520 of the groove shelf 500 with the first protruded hook member 150 and the second protruded hook member 220 respectively, and be capable of adjusting the position along the axial movement of the groove shelf 500. When fastening for combination, the first protruded hook member 150 fastens the first trench 510, and then the second protruded hook member 220 fastens the second trench 520. In order to fasten the second protruded hook member 220 on the second trench 520 smoothly, a round top hook portion 222 is disposed on a top of the second protruded hook member 220. Namely, the second protruded hook member 220 would pass through an edge of the second trench 520 smoothly and is guided in the second trench 520.

An embodiment of a multi-function hook in accordance with the present invention, the single hook has two different fixing ways, so that the hook would be fixed on a fixing body by nailing and fastening ways. Therefore, it is convenient to the users for choosing the fixing ways of the hooks, and to the manufacturers for manufacturing. To sum up, the purpose of the present invention is achieved indeed.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A multi-function hook comprising:
  a hook unit comprising a fixing board and at least one hook body, the fixing board comprising:

a front surface and a back surface opposite to the front surface, wherein the hook body is fixed on the front surface of the fixing board;

a first L-shaped fixing sheet disposed on a top of the fixing board and protruding toward the back surface, the first L-shaped fixing sheet comprising a first hole;

a second L-shaped fixing sheet disposed near a bottom of the fixing board and protruding toward the back surface, the second L-shaped fixing sheet comprising a second hole;

at least one first protruded hook member disposed on the top of the fixing board and protruding toward the back surface; and an assembling hole disposed corresponding to the second L-shaped fixing sheet;

a plug unit assembled to the assembling hole and fixed on the fixing board, the plug unit comprising a cover and at least one second protruded hook member connected with the cover, the second protruded hook member protruding toward the back surface of the fixing board, the cover comprising a hollow hole disposed corresponding to the second L-shaped fixing sheet; and at least one concave disposed on an inner edge of a top of the assembling hole, and a neck portion formed between the second protruded hook member and the cover, wherein the neck portion is coupled to the concave.

2. The multi-function hook as claimed in claim 1, further comprising two elastic side wings disposed on opposite sides of the cover respectively.

3. The multi-function hook as claimed in claim 2, further comprising a non-slip portion with an uneven surface disposed on a surface of the cover.

4. The multi-function hook as claimed in claim 3, further comprising a round top hook portion disposed on a top of the second protruded hook member.

5. The multi-function hook as claimed in claim 1, wherein the back surfaces of the first protruded hook member, the second protruded hook member, the first L-shaped fixing sheet, and the second L-shaped fixing sheets are placed on a same plane.

* * * * *